United States Patent
Beck et al.

[11] Patent Number: 6,107,916
[45] Date of Patent: Aug. 22, 2000

[54] SIGNAL LAMP FOR VEHICLES

[75] Inventors: Christian Beck, Erlangen; Andre Blanke, Lippstadt; Herbert Cramer, Ruethen; Elmar Duenschede, Brilon; Karsten Eichhorn, Ennigerloh; Guenther Fischer, Lippstadt; Klaus Henneboehle, Bueren; Franz-Gerhard Jost, Arnsberg; Christian Plattfaut; Bernhard Scholl, both of Lippstadt, all of Germany

[73] Assignee: Hella Kg Hueck & Co., Lippstadt, Germany

[21] Appl. No.: 09/149,002

[22] Filed: Sep. 8, 1998

[30] Foreign Application Priority Data

Sep. 6, 1997 [DE] Germany ............ 197 39 173

[51] Int. Cl.$^7$ .................................. B60Q 1/54
[52] U.S. Cl. ................. 340/468; 340/472; 362/31; 362/507; 362/571
[58] Field of Search .................. 340/468, 472; 362/31, 507, 511

[56] References Cited

U.S. PATENT DOCUMENTS

| | | | |
|---|---|---|---|
| 5,434,754 | 7/1995 | Li et al. | 362/31 |
| 5,515,245 | 5/1996 | Bobcza | 362/31 |
| 5,791,757 | 8/1998 | O'Neil et al. | 362/32 |

FOREIGN PATENT DOCUMENTS

| | | |
|---|---|---|
| 0 587 501 B1 | 3/1994 | European Pat. Off. . |
| 0 780 265 A2 | 6/1997 | European Pat. Off. . |
| 30 39 740 A1 | 5/1982 | Germany . |
| 31 27 416 A1 | 1/1983 | Germany . |
| 32 36 683 A1 | 4/1983 | Germany . |
| 32 44 710 A1 | 6/1984 | Germany . |
| 33 19 179 A1 | 1/1985 | Germany . |
| 35 18 265 A1 | 11/1985 | Germany . |
| 34 34 536 A1 | 3/1986 | Germany . |
| 35 42 292 A1 | 7/1986 | Germany . |
| 39 12 646 A1 | 11/1989 | Germany . |
| 39 29 955 A1 | 3/1991 | Germany . |
| 41 29 094 A1 | 3/1993 | Germany . |
| 44 27 606 A1 | 2/1996 | Germany . |
| 195 37 628 A1 | 4/1997 | Germany . |
| 297 02 746 U1 | 5/1997 | Germany . |
| 195 47 861 A1 | 6/1997 | Germany . |

OTHER PUBLICATIONS

Decker; Detlef: Celis— Ein Konzept fuer die Pkw–Innenraumbeleuchtung mit Litchtleittechnik. In: ATZ Automobiltechnische Zeitschrift 97, 1995, 7/8, S. 480–483; S. 483 li. Sp.

Jp Patents Abstracts of Japan: 8–124408 A., May 17, 1996.
Jp Patents Abstracts of Japan: 8–216778 A., particularly abstract, Aug. 27, 1996.

*Primary Examiner*—Julie Lieu
*Attorney, Agent, or Firm*—Griffin, Butler, Whisenhunt & Szipl, LLP

[57] ABSTRACT

A signal lamp for vehicles, specifically motor vehicles, has a housing in which at least one light source is positioned, and a light guide from which light is directed in a predetermined light exit direction, whereby the light guide is structured as a long stretched-out light-release element that extends at least in areas along an edge of a housing and/or of a reflector.

20 Claims, 2 Drawing Sheets

SIGNAL LAMP FOR VEHICLES

BACKGROUND OF THE INVENTION

This invention relates to a signal lamp for vehicles, specifically motor vehicles, having a housing in which at least one light source is positioned and having an optical light guide in which light is directed in a direction of a predetermined light exit, or release, direction.

Integrating a signal lamp into a headlamp housing as a position light or parking light is known in the prior art. A recess is commonly provided in a headlamp reflector to accommodate a light source for such a signal lamp. However, this design yields disadvantageous light losses owing to an absence of part of the reflector surface.

Alternatively, positioning a signal lamp for a position or parking light in a separate housing or housing part is also known in the prior art. This is particularly necessary when a headlamp, according to a projection process, has additionally a screen and lens.

European patent document (EP 0 780 265 A2) discloses a rear lamp for vehicles that has a light guide in which light emitted from a light source is deflected in a predetermined light exit direction. It is a disadvantage of this known rear lamp that the light guide is structured in a plate shape, thereby covering an entire surface area of an opening in part of a housing.

It is an object of this invention to provide a signal lamp for vehicles of a type that can be integrated in a space-saving manner into a headlamp housing, whereby any interference between a light function of the signal lamp, on the one hand, and a light function of the headlamp, on the other hand, is largely eliminated.

SUMMARY OF THE INVENTION

According to principles of this invention, an optical light guide is structured as a long stretched-out light-release element that, at least position-wise, extends along an edge of a housing and/or of a reflector.

BRIEF DESCRIPTION OF THE DRAWING

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
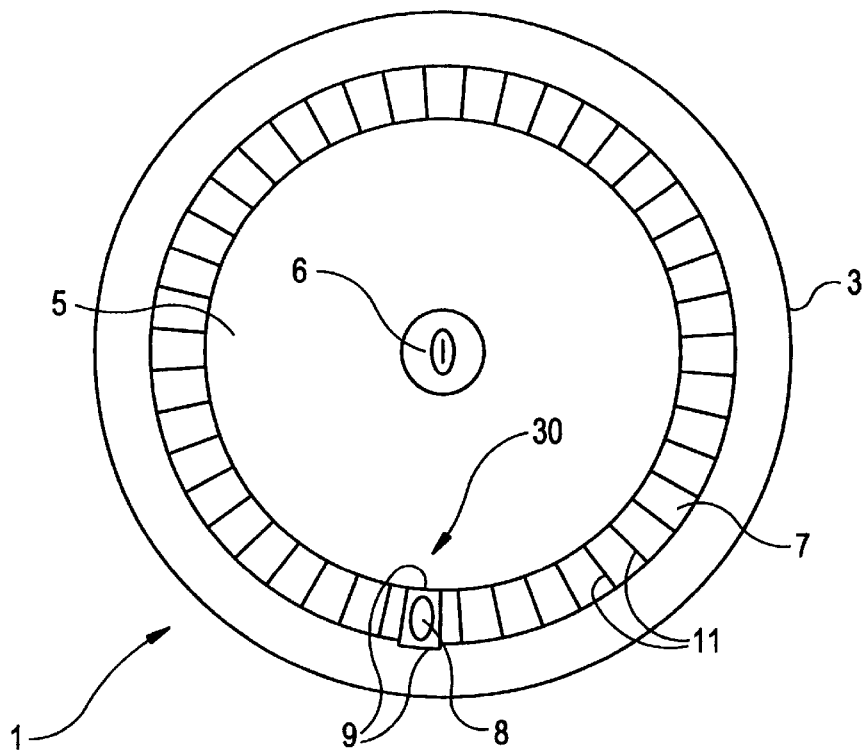
FIG. 1 is a schematic front view of a headlamp housing with a signal lamp at an edge, without a cover plate, in accordance with a first embodiment of this invention.
Figure 2:
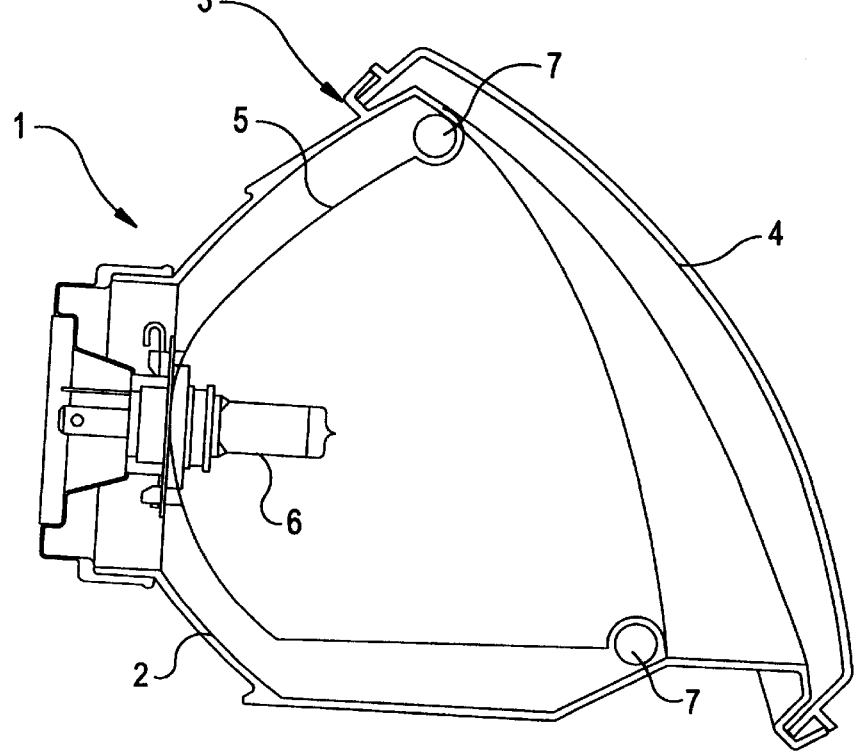
FIG. 2 is a cross-section taken through a headlamp with a signal lamp according to the first embodiment, as in FIG. 1.

As shown in FIGS. 1 and 2, a headlamp 1 for motor vehicles comprises a pot-shaped housing 2 with a light-transmissive cover plate 4 positioned at a circular front edge 3. A reflector 5 and a light source 6 placed in an opening of the reflector 5 are positioned inside an inner space formed by the cover plate 4 and the pot-shaped housing 2. An optical light guide, of light guide material, is placed as a long stretched-out light-release, or light decoupling, element 7 between the reflector 5 and the cover plate 4 at the front edge 3 of the housing 2. The light-release element 7 extends in a circular ring along the edge 3, having a cut-out in a section of the ring for in-putting light into the light-release element 7.

Figure 3:
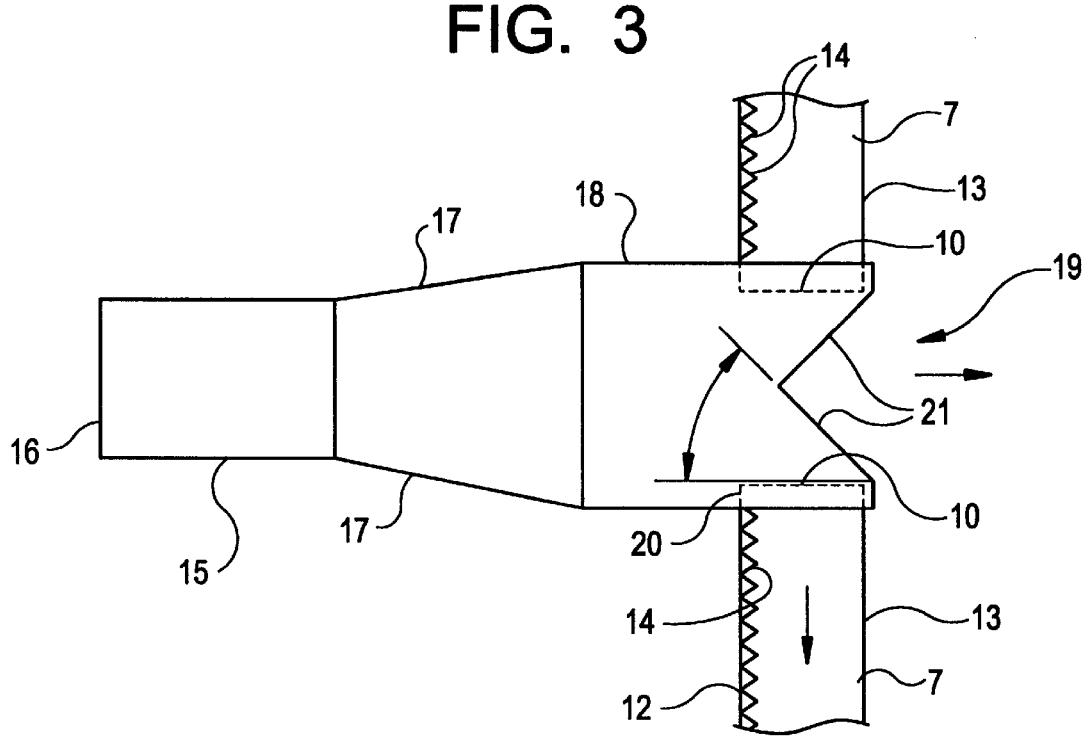
FIG. 3 is a schematic top view of a light input location with a light deflector element used in one embodiment of this invention.

In a first embodiment, per FIG. 1, a second light source 8 for a position light is arranged at an input location 30, having two parallel screens 9 displaced in a radial direction, that correspond to a thickness of the light-release element 7. The screens 9 prevent any loss of light in a radial direction. The light emitted by the second light source 8 is input into end faces 10 of the light-release element 7 spaced respectively from opposite sides of the light source 8. As shown in FIG. 3, the light-release element 7 has regularly positioned reflection surfaces 11, preferably joining immediately into each other, on a back 12, causing total reflection of the light in the direction of a front 13 of the light-release element 7. The reflection surfaces 11 are formed as notch surfaces 14 that are arranged respectively a distance of approximately 2 mm from corresponding adjacent notch surfaces 14.

In a second embodiment, as in FIG. 3, a light deflector element 15 that deflects light from a remote light source (not shown) into the end faces 20, which serve as light input surfaces of the light-release element 7, is provided instead of a light source 8. The light deflector element 15 has an input end 16 into which light from the light source (not shown) is fed. The light deflector element 15 tapers outwardly in a transverse direction of the light deflector element 15, that is perpendicular to the input faces 10, thereby forming oblique surfaces 17. At a light deflector section 18 an indent 19 is formed at a front end of the light deflector element 15. The indent 19 is structured as a notch having an aperture angle of approximately 45 degrees. A depth of the indent 19 is less than a thickness of the light-release element 7. The faces 10 of the light-release element 7 are respectively held in recesses 20 of the light deflector element 15 so that light beams respectively reflected on notch surfaces 21 of the indent 19 are guided directly into the light-release element 7.

Figure 4:
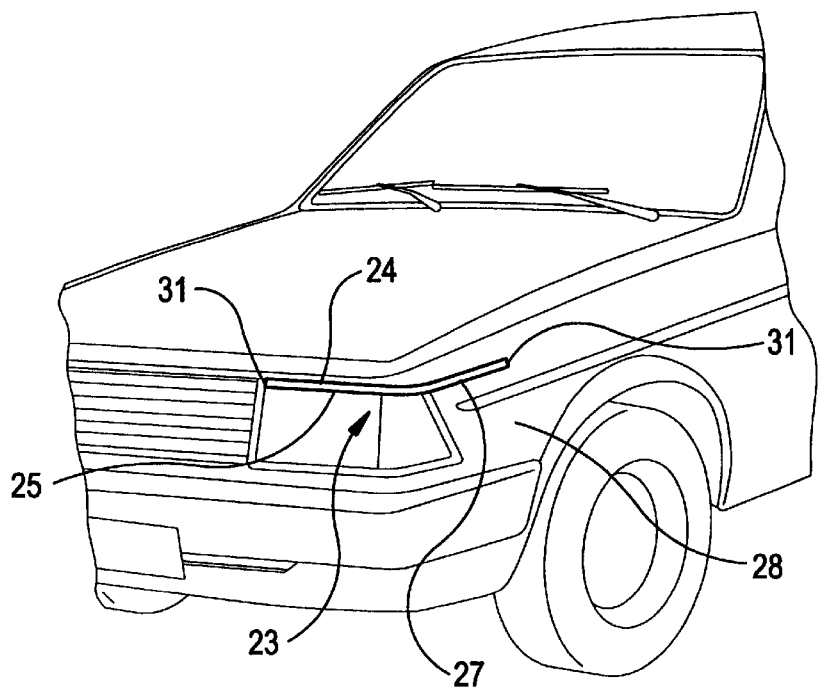
FIG. 4 is a perspective view of a signal lamp of an additional embodiment of this invention mounted on a motor vehicle.

According to a further example of the invention as shown in FIG. 4, a first portion 24 of a light-release element 23 is arranged in an area of an edge 25 of a headlamp 26. A portion 27 of the light-release element 23 extends into an area of an adjacent part of a car body 28, so that, for example, a position light is created on one side of the vehicle. In this structure, light input locations 31 are provided at respective free ends of the light-release element 23, whereby light is fed directly from a light source positioned at an end face. Aside from its shape, the light-release element 23 corresponds in structure to the light-release element 7 described above, and has corresponding indents on its back.

The light-release elements described above are made preferably of a plastic material, specifically from PMMA or (polymethylmethacrylate) or PC (polycarbonate). Such a light-release element can be combined respectively with a headlamp or a directional signal lamp. In such cases, it can be operated independently of the function of the lamp. The light-release elements described above can be placed respectively either immediately at edges of respective reflectors, or at edges of housings.

A specific advantage of this invention is that, owing to placement of the light-release element at an edge of a housing, a lighting function of the headlamp or of a lamp is not impaired. An entire reflector surface can be used for the lighting function. A signal lamp according to principles of the invention can be used universally regardless of headlamp type. An additional housing is unnecessary for projection headlamps. Owing to the long stretched-out, or lengthwise, design of the light-release element, an area increase of the position light is provided, thereby increasing a warning effect.

In a further enhancement of the invention, a light-release element has reflector surfaces immediately at its back, causing homogeneous light distribution of the signal lamp.

In a further enhancement of the invention, a light-release element is circular in cross-section. In a simple manner, the light-release element can be attached at an edge of a headlamp housing by means of a catch or friction, or snapping engagement.

In the one embodiment of the invention, the first part of the light-release element is positioned at the edge of the headlamp housing, while the second part of the light-release element extends outside the headlamp housing in a bordering area of parts of the car body. In this same manner, however, a signal lamp may be made in any shape desired, regardless of a shape of a headlamp. This results in an increase in a light beam surface area and enables the signal lamp to be made in any shape.

In an additional embodiment of the invention, the light-release element extends solely along a periphery of a headlamp housing, with a portion of the periphery being left open for input of light. In this manner, contours of the headlamp are advantageously made visible for warning purposes, so that a warning function derived from the signal lamp is correlated to a shape of the headlamp housing.

In a further form of the invention, a light source is positioned immediately at an end face of the light-release element, so that only minimal light loss occurs.

According to another embodiment, a light deflector element is provided for in-putting light into the light-release element, which has a recess on the front with light deflecting surfaces on both sides of the recess that correspond to faces of the light-release element. In this way, homogeneous light distribution is achieved in combination with the one-piece light-release element.

What is claimed is:

1. A signal lamp for vehicles having a housing in which at least one light source and a reflector are arranged, an optical light guide in which light is directed in a predetermined light-exit direction, wherein the light guide is designed as a long stretched-out light-release element that at least, area-wise, extends along an edge of the reflector.

2. A signal lamp as in claim 1, wherein the light-release element has a reflection surface immediately at a back, for reflecting light in the predetermined light-exit direction.

3. A signal lamp as in claim 1, wherein the reflection surface is structured as a notched surface.

4. A signal lamp as in claim 1, wherein the light-release element is circular in cross-section and wherein the light-release element is frictionally engaged in the housing.

5. A signal lamp as in claim 1, wherein the light-release element has a bent shape, with a first portion of the light-release element extending adjacent an edge of the housing and a second portion extending outside the housing.

6. A signal lamp as in claim 1, wherein the light-release element extends about a periphery of the housing, forming a light input location at which two respective opposite end faces of the light-release element are arranged for in-putting the light.

7. A signal lamp as in claim 1, wherein the light-release element is arranged in a plane with the light source, whereby the light can be input respectively into end faces of the light-release element.

8. A signal lamp as in claim 1, wherein a light deflector element is arranged relative to the light-release element, that has an indent on a front side for deflecting light emitted from the light source, and wherein the light deflector element has recesses on opposite sides of the indent for respectively receiving opposite faces of the light-release element.

9. A signal lamp as in claim 8, wherein the indent is structured as a notch having notch surfaces.

10. A signal lamp as in claim 8, wherein a depth of the indent is less than a thickness of the light-release element.

11. A signal lamp for vehicles having a housing in which at least one light source and a reflector are arranged, an optical light guide in which light is directed in a predetermined light-exit direction, wherein the light guide is designed as a long stretched-out light-release element that at least, area-wise, extends adjacent an edge of the housing.

12. A signal lamp as in claim 11, wherein the light-release element has a reflection surface immediately at a back, for reflecting light in the predetermined light exit direction.

13. A signal lamp as in claim 11, wherein the reflection surface is structured as a notched surface.

14. A signal lamp as in claim 11, wherein the light-release element is circular in cross-section and wherein the light-release element is frictionally engaged in the housing.

15. A signal lamp as in claim 11, wherein the light-release element has a bent shape, with a first portion of the light-release element extending along an edge of the housing and a second portion extending outside the housing.

16. A signal lamp as in claim 11, wherein the light-release element extends about a periphery of the housing, forming a light input location at which two respective opposite end faces of the light-release element are arranged for in-putting the light.

17. A signal lamp as in claim 11, wherein the light-release element is arranged in a plane with the light source, whereby the light can be input respectively into end faces of the light-release element.

18. A signal lamp as in claim 11, wherein a light deflector element is arranged relative to the light-release element, that has an indent on a front side for deflecting light emitted from the light source, and wherein the light deflector element has recesses on opposite sides of the indent for respectively receiving opposite faces of the light-release element.

19. A signal lamp as in claim 18, wherein the indent is structured as a notch having notch surfaces.

20. A signal lamp as in claim 18, wherein a depth of the indent is less than a thickness of the light-release element.

* * * * *